Patented May 10, 1927.

1,628,107

UNITED STATES PATENT OFFICE.

PAUL BRAACH, OF SIEGEN, GERMANY, ASSIGNOR OF ONE-HALF TO HERMANN ROSENBERGER, OF AUGSBURG, GERMANY.

SAUCEPAN AND THE LIKE.

Application filed September 3, 1926, Serial No. 133,461, and in Germany September 12, 1925.

In cooking vessels in which one saucepan rests on another, the known intermediate covers have the drawback that the space provided in this cover for collecting the condensed steam is of very small dimensions, so that when the boiling is continued for a long time, as is necessary for cooking many kinds of food, the condensed steam together with the smuts dissolved and carried over with it from the bottom of the upper vessel finds its way into the lower pan to the detriment of the contents thereof. Also, in these known covers the path of the steam is so arranged and the steam joints so constructed that large quantities of steam continually escape between the cover and the rim of the lower vessel and deposit moisture on the range. Finally, the cover projects into and takes up a considerable part of the internal space of the lower vessel. The cover is readily lifted by the steam formed, with a consequent loss of steam.

According to the invention all these drawbacks are obviated by the arrangement in which the intermediate cover consists of a lower container for receiving the condensed steam and a plate carrying the upper pans and forming a cover for the container; perforations in the plate carrying the upper saucepans allow the steam from the lower container to escape into the atmosphere, while the water of condensation is led from the upper supporting plate into the container forming part of the intermediate cover.

Examples of constructions according to the invention are shown in the accompanying drawings in which:—

Figure 1:
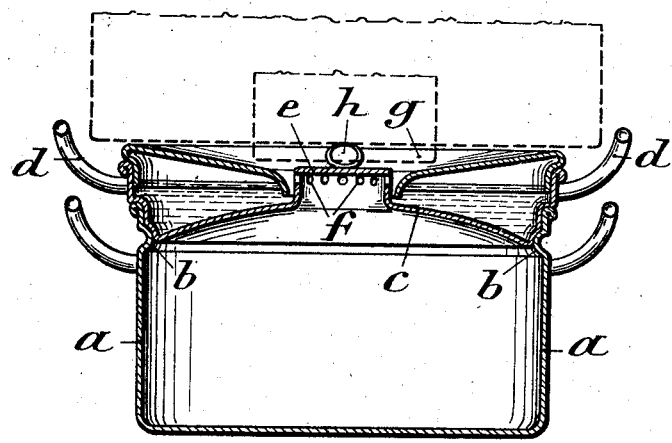
Fig. 1 is a section through the intermediate cover.
Figure 2:
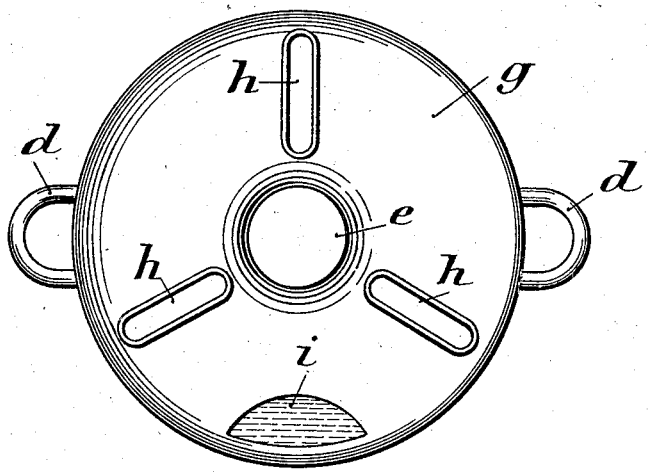
Fig. 2 is a plan of the upper portion of the intermediate cover.
Figure 3:
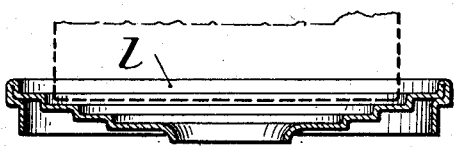
Fig. 3 is a section of a modified construction through the upper portion of the intermediate cover.
Figure 3:
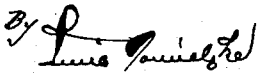

As more particularly shown in Fig. 1, the intermediate cover, which preferably rests on an inwardly projecting groove $b$ of the lower sauce pan $a$, consists of two separable parts $c$ and $g$. The lower part or bottom container $c$ is preferably bent upwards and carries at the centre a steam exhaust funnel $e$, which is provided at the upper part with holes $f$ for the passage of the steam. The upper part $g$ of the intermediate cover is bent downwards and can extend adjacent to the vertical walls of the steam funnel $e$, or, if required, can be connected with the upper closing plate of the funnel $e$. At the lower portion $c$ of the intermediate cover handles $d$ for ready manipulation of the intermediate cover are attached and on the upper part $g$ several radially disposed ribs or supports $h$ are provided on which the upper saucepans rest. In the upper part $g$ of the intermediate cover one or more openings $i$ can be closed by a cover which may be hinged or otherwise mounted.

The intermediate cover can be made of any suitable material, for example aluminium, enamel, tin plate or the like.

In using the cover according to the invention, it is placed on the lower saucepan $a$ after the latter has been filled with the substance to be boiled, and then one or more vessels containing the substances to be cooked are placed on the said cover. The steam developed during the cooking process in the lower vessel $a$ is led by the bottom of the lower portion $c$ upwards into the funnel $e$, flows through the openings $f$ and spreads under the bottom of the upper saucepan; the latter is heated to a temperature approximately equal to that of the boiling point of the water and its contents are raised approximately in the same time as if it were placed over the fire, but without the danger of burning and overheating. The condensed steam drips down from the upper saucepan and falls on the upper part $g$ of the cover, whence it flows into the space between the lower part $c$ and the upper part $g$ either through the holes provided or through the space between the inner edge of the part $g$ of the cover and the funnel $e$. The water collects in the lower part and this space is sufficiently large to receive all the water of condensation even if the boiling is continued for some hours.

After the cooking operation this water can be emptied out by raising the cover $c$ and $g$ and separating the two parts or simply by discharging through one of the openings $i$. In the cover according to the invention there is no danger that, while the upper vessel is being heated, unused steam should escape into the atmosphere or that the room in which the saucepans are used should be made wet by escaping steam or the like. In consequence of the construction May 10, 1927.

P. BRAACH

SAUCEPAN AND THE LIKE

Filed Sept. 3, 1926

1,628,107

INVENTOR:
Paul Braach

Attorney.